US012718398B2

(12) United States Patent
Hirakawa

(10) Patent No.: US 12,718,398 B2
(45) Date of Patent: Aug. 25, 2026

(54) DETERMINATION APPARATUS, DETERMINATION METHOD, DETERMINATION SYSTEM, AND NON-TRANSITORY COMPUTER-READABLE MEDIUM STORING PROGRAM

(71) Applicant: NEC Corporation, Tokyo (JP)

(72) Inventor: Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 462 days.

(21) Appl. No.: 18/267,612

(22) PCT Filed: Mar. 23, 2021

(86) PCT No.: PCT/JP2021/011852
§ 371 (c)(1),
(2) Date: Jun. 15, 2023

(87) PCT Pub. No.: WO2022/201282
PCT Pub. Date: Sep. 29, 2022

(65) Prior Publication Data
US 2024/0046508 A1 Feb. 8, 2024

(51) Int. Cl.
*G06T 7/73* (2017.01)

(52) U.S. Cl.
CPC ...... *G06T 7/73* (2017.01); *G06T 2207/30196* (2013.01)

(58) Field of Classification Search
CPC ............. G06T 7/73; G06T 2207/30196; G06T 2207/20081; H04N 7/18
See application file for complete search history.

(56) References Cited

U.S. PATENT DOCUMENTS

2019/0130602 A1* 5/2019 Hall et al. ................. G06T 7/74

FOREIGN PATENT DOCUMENTS

| | | | |
|---|---|---|---|
| JP | H07-28985 | A | 1/1995 |
| JP | 2006-094100 | A | 4/2006 |
| JP | 2017-069748 | A | 4/2017 |
| JP | 2020-123239 | A | 8/2020 |
| WO | 2018/180040 | A1 | 10/2018 |

OTHER PUBLICATIONS

Machine translation for JP 2017-069748, IDS (Year: 2017).*
International Search Report for PCT Application No. PCT/JP2021/011852, mailed on Jun. 22, 2021.

* cited by examiner

*Primary Examiner* — Qian Yang
(74) *Attorney, Agent, or Firm* — Sughrue Mion, PLLC

(57) ABSTRACT

A determination apparatus includes at least one memory storing instructions, and at least one processor. The at least one processor is configured to execute the instructions to acquire image data of a predetermined space captured by an image capturing device, estimate articulation points of a person in the image data, set a feature element of the person based on the articulation points, determine whether the person is in a reference region set in advance, based on the feature element, output information regarding a determination result of the determination made by the entry determining unit.

7 Claims, 10 Drawing Sheets

DETERMINATION APPARATUS, DETERMINATION METHOD, DETERMINATION SYSTEM, AND NON-TRANSITORY COMPUTER-READABLE MEDIUM STORING PROGRAM

This application is a National Stage Entry of PCT/JP2021/011852 filed on Mar. 23, 2021, the contents of all of which are incorporated herein by reference, in their entirety.

TECHNICAL FIELD

The present invention relates to determination apparatuses, determination methods, determination systems, and non-transitory computer-readable media storing programs.

BACKGROUND ART

Techniques for detecting an entry of a person captured in an image into a predetermined region are being developed.

For example, a posture estimation device is disclosed that calculates a feature value of a detected subject based on a captured image, switches, based on the calculated feature value, a model parameter for estimating a posture of the subject, and estimates a posture with use of the switched model parameter (Patent Literature 1).

Meanwhile, a heavy machine's approach monitoring system is disclosed that sets a single-layer or multilayer danger area around a power transmission line, determines whether a part of a heavy machine is in the danger area, and, if a part of the heavy machine is in the danger area, performs an approach monitoring operation of issuing an alert (Patent Literature 2).

Furthermore, a video image processing device is disclosed that includes a display controlling means that displays, on a display unit, a path showing a change in the position of a subject in a video image (Patent Literature 3).

CITATION LIST

Patent Literature

Patent Literature 1: Japanese Unexamined Patent Application Publication No. 2020-123239

Patent Literature 2: Japanese Unexamined Patent Application Publication No. H07-028985

Patent Literature 3: International Patent Publication No. WO2018/180040

SUMMARY OF INVENTION

Technical Problem

There exists a desire for suitable techniques for determining whether a specific part of a person is in a predetermined region. Furthermore, there exists a demand to grasp a history of actions of a person determined to have entered a predetermined region.

The present disclosure has been made in view of such circumstances and is directed to providing a determination apparatus, a determination method, a determination system, and a program that each appropriately make a determination in entry detection.

Solution to Problem

A determination apparatus according to one example embodiment of the present disclosure includes an image data acquiring unit, an articulation point estimating unit, a feature element setting unit, an entry determining unit, and an output unit. The image data acquiring unit acquires image data of a predetermined space captured by an image capturing device. The articulation point estimating unit estimates articulation points of a person in the image data. The feature element setting unit sets a feature element of the person based on the articulation points. The entry determining unit determines whether the person is in a reference region set in advance, based on the feature element. The output unit outputs information regarding a determination result of the determination made by the entry determining unit.

In a determination method according to one example embodiment of the present disclosure, a computer executes the following method. The computer acquires image data of a predetermined space captured by an image capturing device. The computer estimates articulation points of a person in the image data. The computer sets a feature element of the person based on the articulation points. The computer determines whether the person is in a reference region set in advance, based on the feature element. The computer outputs information regarding a determination result of the determining.

A program according to one example embodiment of the present disclosure causes a computer to execute the following steps. The computer acquires image data of a predetermined space captured by an image capturing device. The computer estimates articulation points of a person in the image data. The computer sets a feature element of the person based on the articulation points. The computer determines whether the person is in a reference region set in advance, based on the feature element. The computer outputs information regarding a determination result of the determining.

Advantageous Effects of Invention

The present disclosure can provide a determination apparatus, a determination method, a determination system, and a program that each appropriately make a determination in entry detection.

EXAMPLE EMBODIMENT

Figure 1:
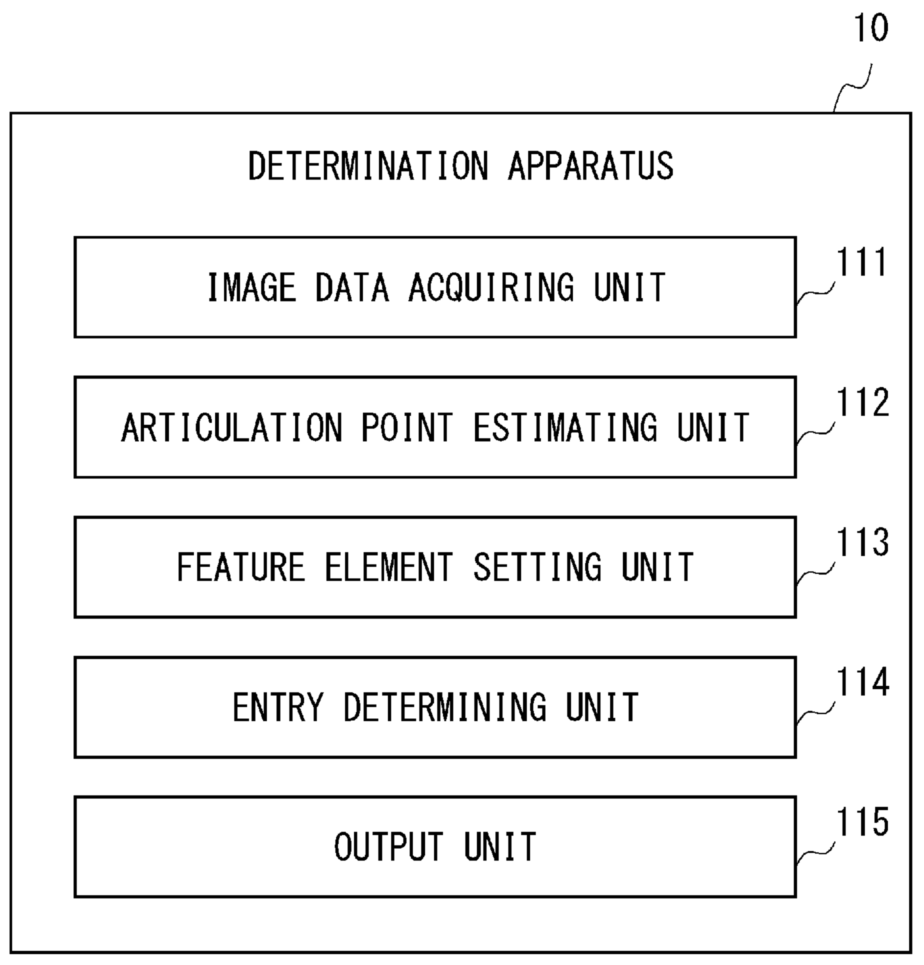
FIG. 1 is a block diagram showing a configuration of a determination apparatus according to a first example embodiment.

Hereinafter, the present invention will be described through example embodiments of the invention, but the following example embodiments do not limit the invention set forth by the claims. Not all the configurations described in the example embodiments are necessarily essential as means for solving the problem. In order to make the description clear, the following description and the drawings include omissions or simplifications, as appropriate. In the drawings, identical elements are given identical reference characters, and their duplicate description will be omitted, as necessary.

First Example Embodiment

An example embodiment of the present invention will be described below with reference to drawings. FIG. 1 is a block diagram of a determination apparatus 10 according to a first example embodiment. The determination apparatus 10 shown in FIG. 1 is used while communicably connected to a camera (image capturing device) installed outdoors or inside a predetermined facility. The determination apparatus 10 has an entry detecting function of determining whether a person has entered a predetermined reference region set in image data and outputting the result of that determination. The determination apparatus includes, as its main components, an image data acquiring unit 111, an articulation point estimating unit 112, a feature element setting unit 113, an entry determining unit 114, and an output unit 115.

The image data acquiring unit 111 acquires image data of a predetermined space captured by an image capturing device. The image data acquiring unit 111 may be connected to a single camera or to a plurality of cameras. The camera or cameras to which the image data acquiring unit 111 is connected may be stationary to capture an image within a predetermined angle of view or may be movable for panning, tilting, or zooming. The image data acquiring unit 111 supplies image data acquired from the camera to each component, as appropriate.

The articulation point estimating unit 112 receives image data from the image data acquiring unit 111 and estimates an articulation point of a person in the received image data. Specifically, the articulation point estimating unit 112, for example, identifies an image of a person (person image) in received image data. For example, the articulation point estimating unit 112 searches for a region that has a feature value matching a feature value of a person image by performing, for example, a convolution process on image data. The articulation point estimating unit 112 identifies the region that has a feature value matching the feature value of the person image as a person image.

Furthermore, the articulation point estimating unit 112 estimates an articulation point of that person from the person image. Examples of articulation points include a wrist, an elbow, a shoulder, a neck, a hip joint, or a knee. The articulation point estimating unit 112 may estimate an articulation point from a single person image or from image data of a plurality of images captured at different times. The articulation point estimating unit 112 supplies information regarding an estimated articulation point to the feature element setting unit 113.

In response to receiving information regarding an articulation point from the articulation point estimating unit 112, the feature element setting unit 113 sets a feature element of a person with use of the estimated articulation point. A feature element of a person is a specific articulation point or an element related to an articulation point to be set for entry detection. An identified person image includes a plurality of articulation points. Which one of these articulation points is to be set as a feature element may be set in advance or may be set individually. In a case in which a feature element is set individually, such a feature element may be set by a user of the determination apparatus 10 or may be set automatically in accordance with a predetermined condition set in advance. Having set a feature element, the feature element setting unit 113 supplies information regarding the set feature element to the entry determining unit 114.

The entry determining unit 114 receives information regarding a feature element from the feature element setting unit 113 and determines whether a person associated with that feature element is in a reference region. A reference region is a specific region for performing entry detection and is a region set in advance in image data. Having determined whether a person associated with a feature element is in a reference region, the entry determining unit 114 supplies information regarding the result of that determination to the output unit 115. In the following description, information regarding a result of a determination may also be referred to simply as a determination result.

The output unit 115 receives, from the entry determining unit 114, information regarding a determination result of a determination made by the entry determining unit 114 and outputs the received information. A determination result that the output unit 115 outputs is output in a manner that allows a user of the determination apparatus to recognize the determination result. To be more specific, a determination result may be output, for example, in the form of audio, light, or an image. A determination result may also be transmitted to another desired device communicably connected to the determination apparatus 10.

Figure 2:
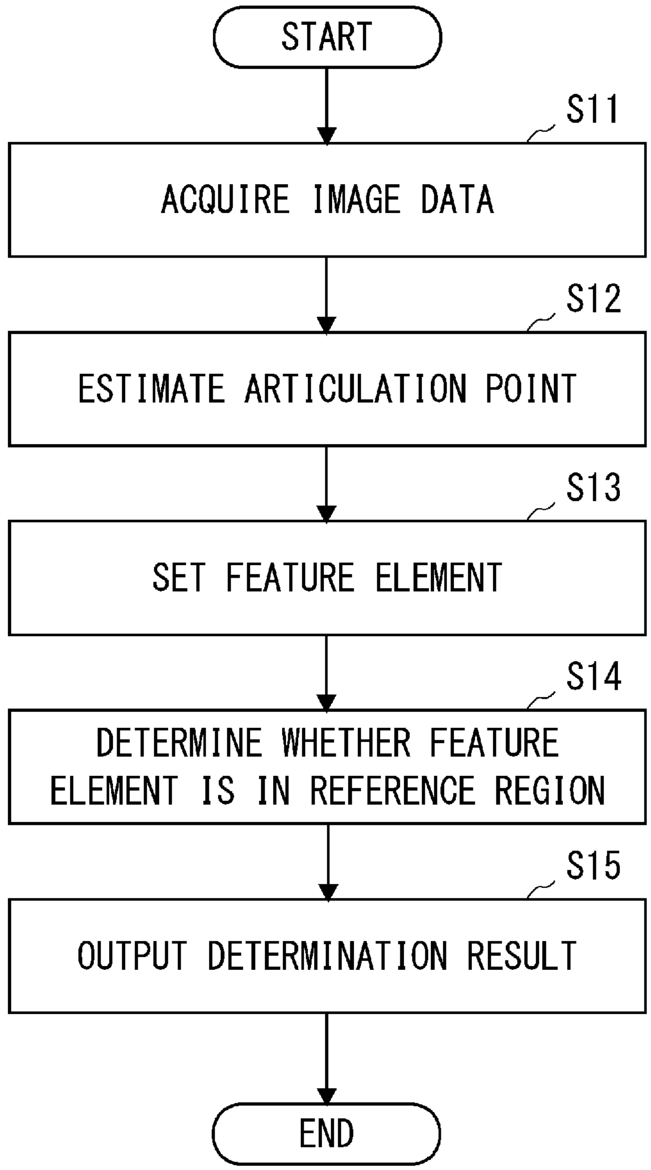
FIG. 2 is a flowchart showing a determination method according to the first example embodiment.

Next, a process that the determination apparatus 10 executes will be described with reference to FIG. 2. FIG. 2 is a flowchart showing a determination method according to the first example embodiment. The flowchart shown in FIG. 2 starts, for example, in response to the determination apparatus 10 being started. Alternatively, the flowchart shown in FIG. 2 may start in response to image data received from an image capturing device.

First, the image data acquiring unit 111 acquires image data of a predetermined space captured by an image capturing device (step S11). The image data acquiring unit 111 supplies the acquired image data to at least the articulation point estimating unit 112.

Next, the articulation point estimating unit 112 estimates an articulation point of a person in the received image data (step S12). The articulation point estimating unit 112 supplies information regarding the estimated articulation point to the feature element setting unit 113. In a case in which the articulation point estimating unit 112 has identified a plurality of person images in image data, the articulation point estimating unit 112 estimates an articulation point in each of the person images. In other words, the articulation point estimating unit 112 generates information corresponding to the plurality of person images and supplies the generated information to the feature element setting unit 113.

Next, with use of the information received from the articulation point estimating unit 112, the feature element setting unit 113 sets a feature element based on the articulation point in the person image (step S13). Having set the feature element, the feature element setting unit 113 supplies information regarding that feature element to the entry determining unit 114. In a case in which a plurality of person images are being identified in image data, the feature element setting unit 113 sets a feature element corresponding to each of the person images.

Next, with use of the set feature element, the entry determining unit 114 determines whether a person associated with that feature element is in a reference region set in advance (step S14). In a case in which a plurality of person images are being identified in image data, the entry determining unit 114 may determine whether any of the person images is in a reference region. Furthermore, in a case in which a plurality of person images are being identified in image data, the entry determining unit 114 may make a determination concerning entry detection with respect to each of the person images.

Next, the output unit 115 outputs information regarding a determination result of the determination (step S15). In response to the output unit 115 outputting the determination result, the determination apparatus 10 terminates this series of processes.

Thus far, the determination apparatus according to the first example embodiment has been described. The determination apparatus 10 includes, as its components that are not illustrated, a processor and a storage device. The storage device of the determination apparatus 10 includes, for example, a storage device that includes a non-volatile memory, such as a flash memory or a solid-state drive (SSD). In this case, the storage device of the determination apparatus stores therein a computer program (also referred to below simply as a program) for executing the image processing method described above. Meanwhile, the processor loads the computer program from the storage device onto a buffer memory, such as a dynamic random-access memory (DRAM), and executes this program.

The components of the determination apparatus 10 may each be implemented by a dedicated piece of hardware. Part or the whole of each constituent element may be implemented by, for example, general-purpose or dedicated circuitry, a processor, or a combination thereof. Such constituent elements may be constituted by a single chip or by a plurality of chips connected via a bus. Part or the whole of each constituent element of the devices may be implemented by a combination of, for example, the circuitry described above and a program. For the processor, a central processing unit (CPU), a graphics processing unit (GPU), a field-programmable gate array (FPGA), or the like can be used. The description regarding the components given in this section may apply also to other apparatuses or systems described below in the present disclosure.

In a case in which part or the whole of each constituent element of the determination apparatus 10 is implemented by, for example, a plurality of information processing devices or circuitries, the plurality of information processing devices or the circuitries may be centrally disposed or distributedly disposed. For example, such information processing devices or circuitries may be implemented in a mode in which they are interconnected via a communication network, as in, for example, a client server system or a cloud computing system. The functions of the determination apparatus 10 may be provided in the form of Software as a Service (SaaS).

Thus far, the first example embodiment has been described. The determination apparatus 10 according to the first example embodiment identifies a person image from image data and, if the identified person image is in a masking region, performs a masking process. Therefore, the first example embodiment can provide a determination apparatus, a determination method, and a program that each appropriately make a determination in entry detection.

Second Example Embodiment

Figure 3:
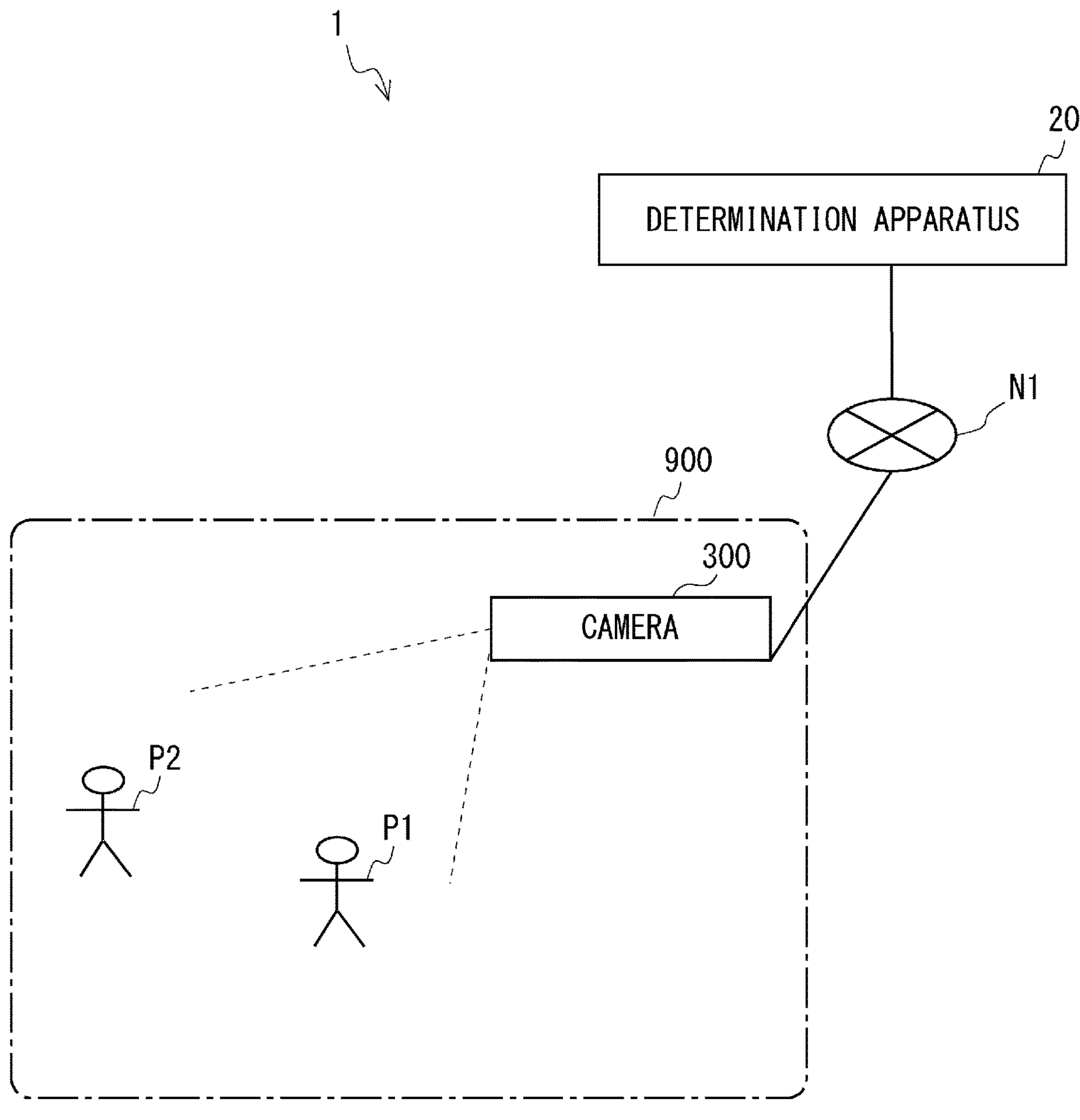
FIG. 3 is a block diagram showing a configuration of a determination system according to a second example embodiment.

Next, a second example embodiment will be described. FIG. 3 is a block diagram showing a configuration of a determination system according to the second example embodiment. A determination system 1 shown in FIG. 3 includes a determination apparatus 20 and a camera 300. The determination apparatus 20 and the camera 300 are communicably connected to each other via a network N1.

The camera 300 is installed in a space 900. The camera 300 captures a scene in the space 900 to generate image data and supplies the generated image data to the determination apparatus 20 via the network N1. The space 900 that the camera 300 captures may include, for example, a person P1 and a person P2. In the space 900, a predetermined reference region is set in advance. In the determination system 1, the determination apparatus 20, connected to the camera 300, determines whether the person P1 or the person P2 is in the reference region.

Figure 4:
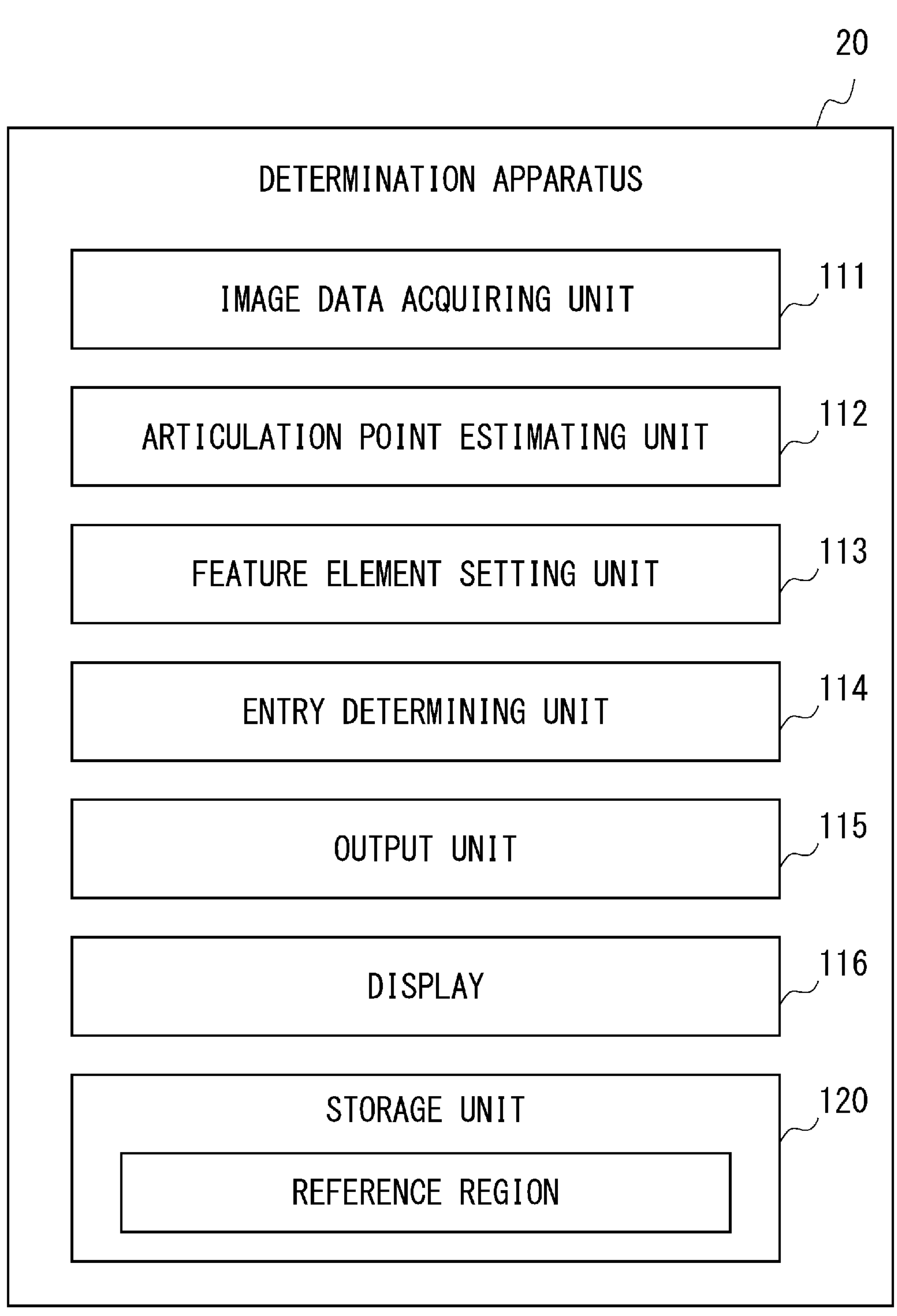
FIG. 4 is a block diagram showing a configuration of a determination apparatus according to the second example embodiment.

Next, the determination apparatus according to the present example embodiment will be described with reference to FIG. 4. FIG. 4 is a block diagram showing a configuration of the determination apparatus 20 according to the second example embodiment. The determination apparatus 20 shown in FIG. 4 differs from the determination apparatus 10 according to the first example embodiment in that the determination apparatus 20 includes a display 116 and a storage unit 120.

The display 116 is, for example, a display device that includes an organic electroluminescence or liquid-crystal panel. The display 116 receives a determination result from the output unit 115 in the form of image data and displays the received determination result. The display of a determination result may include, for example, an image captured by the camera 300. Furthermore, the display of a determination result may be an image captured by the camera 300 with an articulation point, a feature element, and a reference region superposed on the image.

The storage unit 120 is, for example, a storage device that includes a non-volatile memory, such as a flash memory, a solid-state drive (SSD), or an erasable programmable read-only memory (EPROM). The storage unit 120 stores therein, for example, information regarding a reference region. The storage unit 120 supplies information stored therein regarding a reference region to the entry determining unit 114.

The output unit 115 according to the present example embodiment outputs, as a determination result, information that includes an alert, if it is determined that a feature element associated with an identified person has entered a reference region. The output unit 115 supplies such an alert to the display 116.

Figure 5:
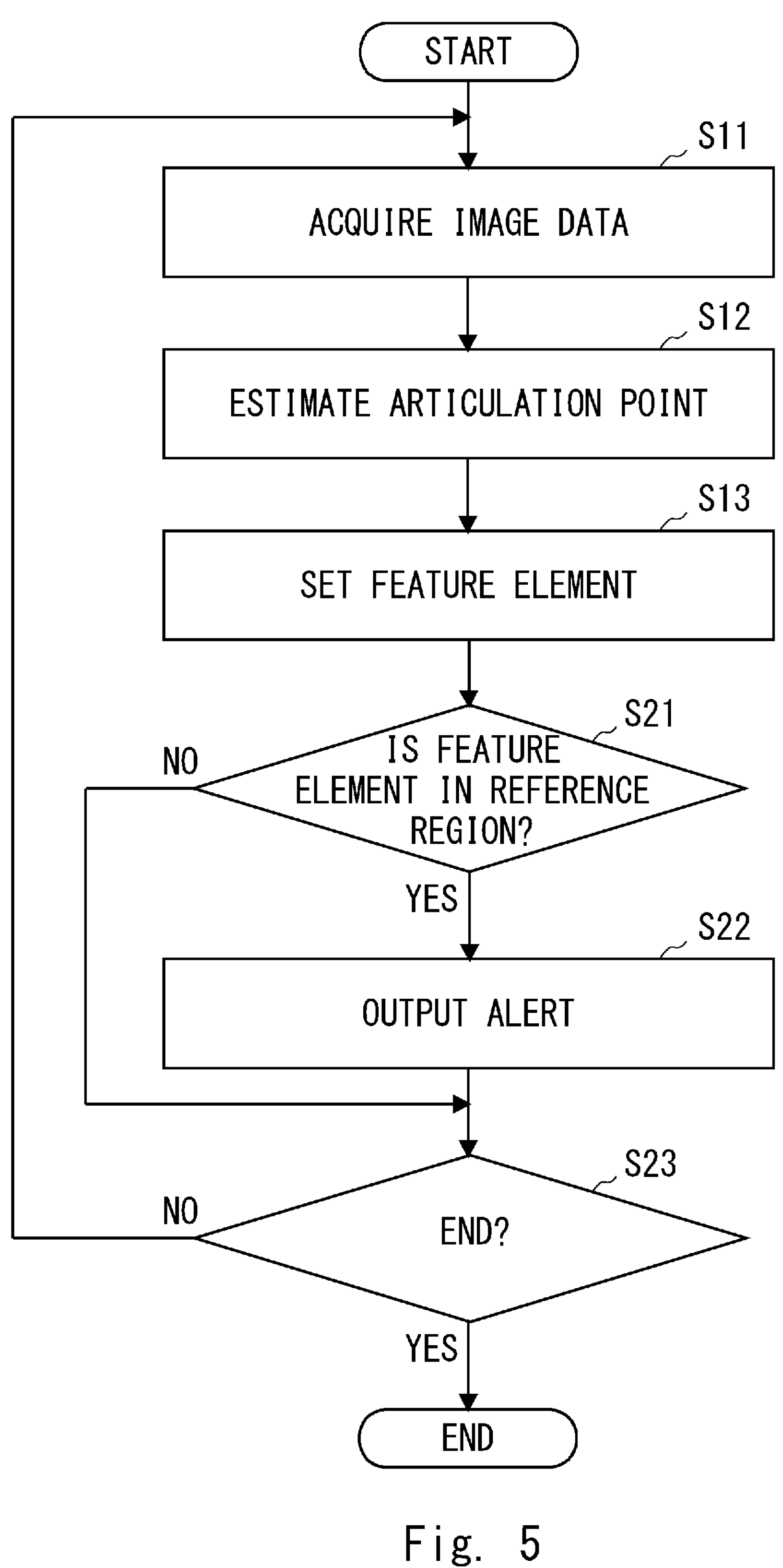
FIG. 5 is a flowchart showing a determination method according to the second example embodiment.

Next, a process executed by the determination apparatus according to the present example embodiment will be described. FIG. 5 is a flowchart showing a determination method according to the second example embodiment. The flowchart shown in FIG. 5 differs from the flowchart shown in FIG. 2 in the processes after step S13.

After step S13, the entry determining unit 114 determines whether the set feature element is in a reference region (step S21). If the entry determining unit 114 fails to determine that the set feature element is in the reference region (step S21: NO), the determination apparatus 20 proceeds to step S23. Meanwhile, if the entry determining unit 114 determines that the set feature element is in the reference region (step S21: YES), the determination apparatus 20 proceeds to step S22.

At step S22, the output unit 115 outputs an alert in accordance with the determination result (step S22). In this case, the output unit 115 supplies, to the display 116, a signal for displaying information that an entry has been detected. The output unit 115 may output an alert continuously for a predetermined length of time. The output unit 115 having output the alert, the determination apparatus proceeds to step S23.

At step S23, the determination apparatus 20 determines whether to terminate the series of processes (step S23). The series of processes may be terminated, for example, when the determination apparatus 20 is stopped by a user operation or when image data stops being supplied from the camera 300. If the determination apparatus 20 determines to terminate the series of processes (step S23: YES), the determination apparatus 20 terminates the process. Meanwhile, if the determination apparatus 20 fails to determine to terminate the series of processes (step S23: NO), the determination apparatus 20 returns to step S11 and continues with the process.

Figure 6:
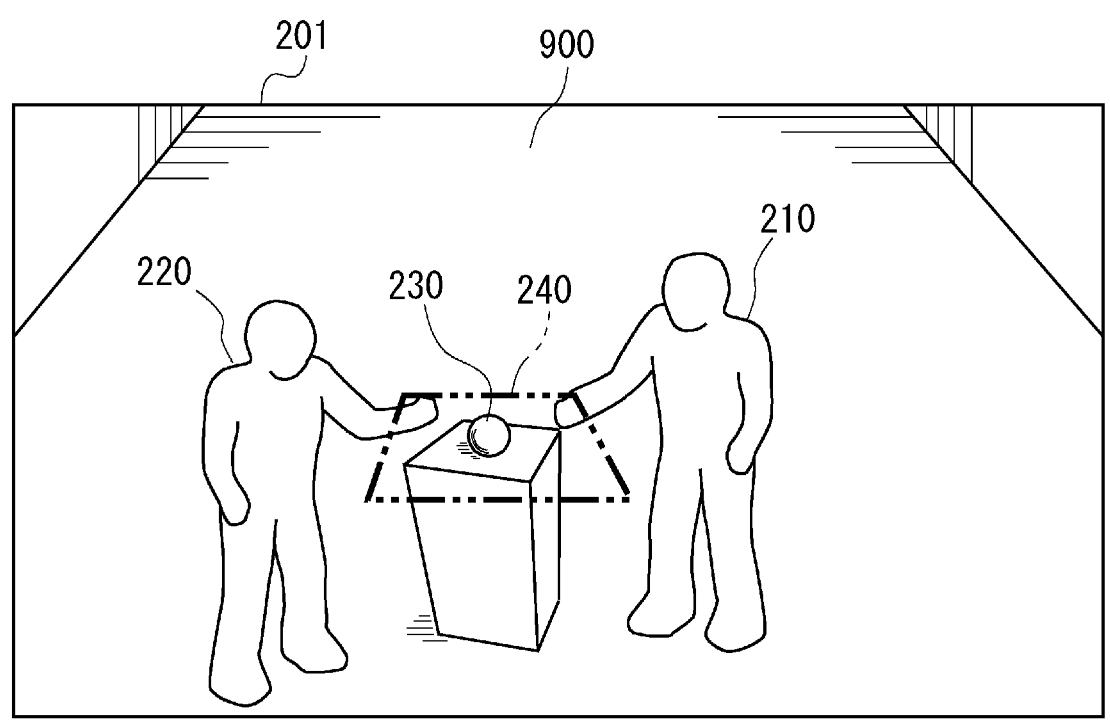
FIG. 6 shows a first example of an image to be processed by a determination apparatus.

Next, a specific example of an image that the determination apparatus 20 processes will be described. FIG. 6 shows a first example of an image to be processed by the determination apparatus. FIG. 6 shows an image 201. The image 201 is an example of an image displayed on the display 116. The image 201 shows a scene in the space 900 captured by the camera 300. The image 201 includes a first person image 210 of a person P1, a second person image 220 of a person P2, and a predetermined object image 230. For the object image 230, a reference region 240 is set.

In FIG. 6, the reference region 240 is indicated by a trapezoid drawn by a thick dashed-two-dotted line. The reference region 240 is indicated by a trapezoid because the reference region 240 is set by a rectangle that lies parallel to the horizontal plane of the space 900. In this manner, the reference region 240 is set so as to correspond simulatively to a predetermined shape and to a predetermined height in the space 900. In the situation described above, the determination apparatus 20 determines whether a person is in the reference region 240.

Figure 7:
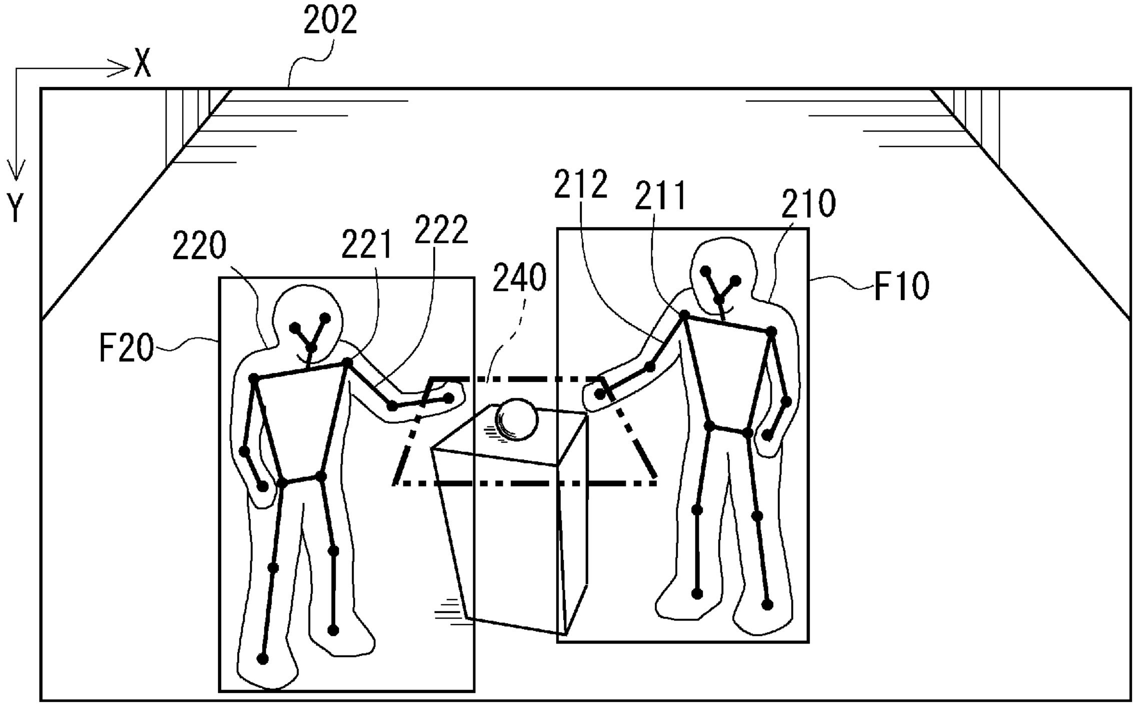
FIG. 7 shows a second example of an image to be processed by a determination apparatus.

Next, articulation points that the determination apparatus 20 estimates will be described. FIG. 7 shows a second example of an image to be processed by the determination apparatus.

When the articulation point estimating unit 112 identifies a person image, the articulation point estimating unit 112 analyzes, for example, an image 202 through a convolution process to determine whether a person image of a predetermined size is present. In the image 202, for example, the upper left corner of the image is the origin, the horizontal direction running from the left to the right is the X-axis, and the vertical direction running from the top to the bottom is the Y-axis. In this case, for example, the articulation point estimating unit 112 performs a process of analyzing the image in the positive direction along the X-axis from the origin, and having completed the process at the right end, the articulation point estimating unit 112 shifts in the positive direction along the Y-axis and performs the analyzing process again from the left end into the positive direction along the X-axis.

At this point, the articulation point estimating unit 112 may change the size of a rectangle set for an analysis in accordance with the depth of the image 201. In other words, the articulation point estimating unit 112 identifies a person image by a relatively smaller size in the upper side of the image 201, that is, in the deeper side of the space, and identifies a person image by a relatively larger size in the lower side of the image 201, that is, in the closer side of the space. Through such a process, the articulation point estimating unit 112 can identify a person image efficiently.

FIG. 7 shows a rectangle F10 and a rectangle F20. The rectangle F10 is used when the articulation point estimating unit 112 identifies a first person image 210. The articulation point estimating unit 112 identifies the first person image 210 by calculating feature values of the first person image 210 in the rectangle F10. In a similar manner, the articulation point estimating unit 112 identifies a second person image 220 by calculating feature values of the rectangle F20.

Having identified a person image, the articulation point estimating unit 112 estimates articulation points in the identified person image. The articulation point estimating unit 112 estimates articulation points in the person image, for example, from the feature values of the identified person image. In order to estimate, for example, the posture of the person in the person image, the articulation point estimating unit 112 may include a learning model trained by machine learning. In other words, in this case, with use of the learning model, the articulation point estimating unit 112, for example, estimates the posture of the person in the rectangle F10 shown in FIG. 7 and estimates articulation points from the estimated posture of the person.

In FIG. 7, a plurality of articulation points 211 are superposed on the first person image 210. Furthermore, a plurality of connecting lines 212 connecting the articulation points are also superposed on the first person image 210. In a similar manner, a plurality of articulation points 221 are superposed on the second person image 220. Furthermore, a plurality of connecting lines 222 connecting the articulation points are also superposed on the second person image 220.

(First Example of Entry Determination)

Figure 8:
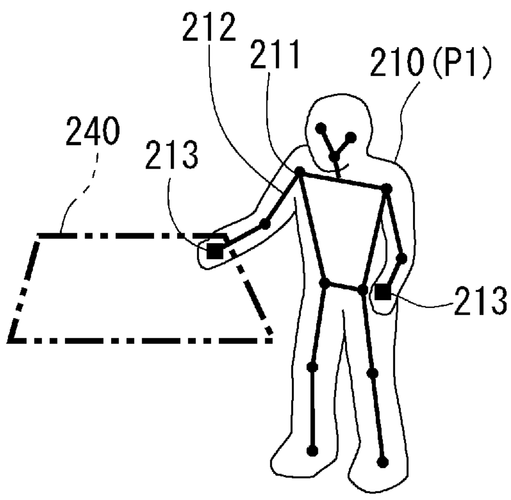
FIG. 8 shows a first example of an entry determination.

Next, an example of an entry determination performed based on a relationship between a reference region and a feature element set by the determination apparatus 20 will be described. FIG. 8 shows a first example of an entry determination. FIG. 8 shows the reference region 240, the first person image 210, the articulation points 211 in the first person image 210, and the connecting lines 212 connecting the articulation points 211 in the first person image 210 extracted from FIG. 7.

In the first person image 210 shown in FIG. 8, feature elements 213 are indicated by black rectangles at the positions of the articulation points 211 corresponding to the right and left hands. In other words, the example shown in FIG. 8 shows a state in which the feature element setting unit 113 has set, of the articulation points 211 in the first person image 210, points located at ends (i.e., end points) as the feature elements 213. In the specific example shown in FIG. 8, the feature element setting unit 113 has set, as a feature element, an articulation point at the tip of a hand, that is, an end point of the articulation points. Instead of setting an articulation point at the tip of a hand, the feature element setting unit 113 may set the head or the tip of a foot of a person as an end point of the articulation points.

Furthermore, in FIG. 8, one of the set two feature elements 213 is in the reference region 240. In this case, the entry determining unit 114 determines that the feature element 213 is in the reference region 240. In this manner, when one of the articulation points is set as a feature element and the set feature element is in the reference region 240, the entry determining unit 114 determines that the person P1 in the first person image 210 is in the reference region 240. Being configured in this manner, the determination apparatus 20 according to the present example embodiment can appropriately detect an entry of a tip of a body into a reference region.

An end point described above may be defined as follows. Specifically, the feature element setting unit 113 sets a connecting line 212 connecting two articulation points 211 based on image data corresponding to a person, recognizes, among a plurality of articulation points 211, an articulation point 211 to which a single connecting line 212 is connected as an end point, and sets a feature element 213 to this end point.

(Second Example of Entry Determination)

Figure 9:
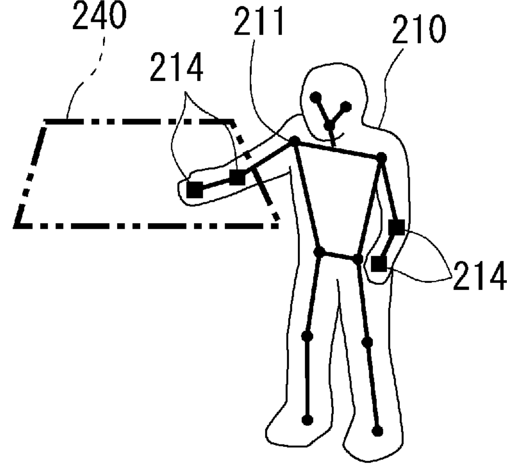
FIG. 9 shows a second example of an entry determination.

Next, an example shown in FIG. 9 will be described. FIG. 9 shows a second example of an entry determination. The feature element setting unit 113 of the example shown in FIG. 9 sets, as feature elements, a plurality of articulation points adjacent to each other including an end point described above. The feature element setting unit 113 may set, as feature elements, a plurality of adjacent articulation points corresponding to an arm or a leg of a person. In this case, the entry determining unit 114 determines whether all of the plurality of adjacent feature elements are in a reference region.

In the case of the example shown in FIG. 9, the feature element setting unit 113 has set two sites including the tips of the hands and the elbows as feature elements 214. In the example shown in FIG. 9, the feature elements 214 corresponding to one of the arms are in the reference region 240. In this case, the entry determining unit 114 determines that the first person image 210 is in the reference region 240.

(Third Example of Entry Determination)

Figure 10:
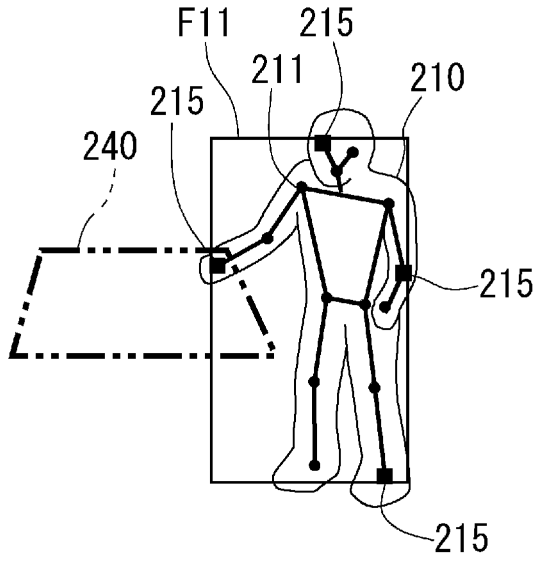
FIG. 10 shows a third example of an entry determination.

Next, an example shown in FIG. 10 will be described. FIG. 10 shows a third example of an entry determination. The feature element setting unit 113 of the example shown in FIG. 10 identifies a circumscribed rectangle that touches the exterior side of a person and sets an articulation point that touches this circumscribed rectangle as a feature element.

In the case of the example shown in FIG. 10, a circumscribed rectangle F11 is set to enclose the articulation points 211 in the first person image 210. The feature element setting unit 113 sets articulation points that touch the perimeter of the circumscribed rectangle F11 as feature elements 215. Furthermore, in the example shown in FIG. 10, of the plurality of set feature elements 215, the feature element 215 that touches the left side of the circumscribed rectangle F11 is in the reference region 240. Accordingly, the entry determining unit 114 determines that the first person image 210 is in the reference region 240. Being configured as described above, the determination apparatus 20 can set an articulation point located at an outer edge portion of a person image as a feature element.

(Fourth Example of Entry Determination)

Figure 11:
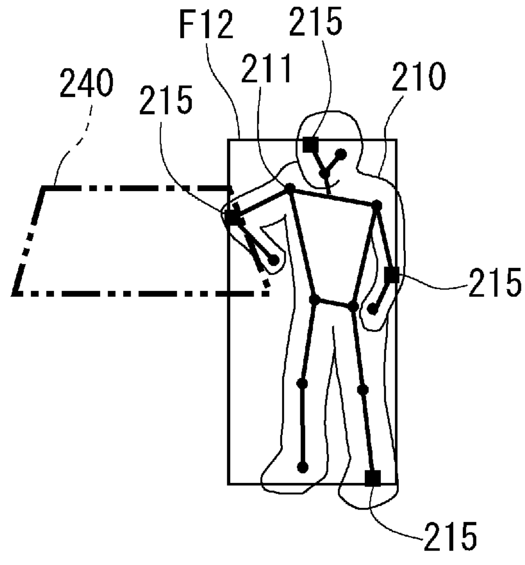
FIG. 11 shows a fourth example of an entry determination.

Next, an example shown in FIG. 11 will be described. FIG. 11 shows a fourth example of an entry determination. As in the example shown in FIG. 10, the feature element setting unit 113 of the example shown in FIG. 11 also sets an articulation point that touches a circumscribed rectangle touching the exterior side of a person as a feature element.

In the case of the example shown in FIG. 11, a circumscribed rectangle F12 is set to enclose the articulation points 211 in the first person image 210. In the first person image 210 shown in FIG. 11, the elbow located in the left side of the drawing is bent such that the elbow protrudes away from the body. Thus, the articulation point at that elbow touches the circumscribed rectangle F12. Therefore, the feature element setting unit 113 sets the articulation point that touches the left side of the circumscribed rectangle F12 as a feature element 215. Furthermore, in FIG. 11, the feature element 215 that touches the left side of the circumscribed rectangle F12 is in the reference region 240. Accordingly, the entry determining unit 114 determines that the first person image 210 is in the reference region 240.

(Fifth Example of Entry Determination)

Figure 12:
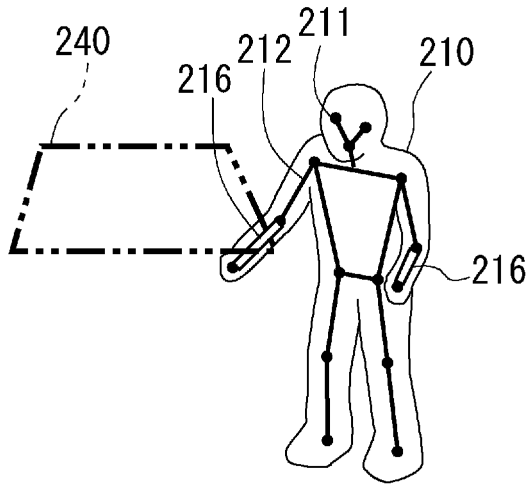
FIG. 12 shows a fifth example of an entry determination.

Next, an example shown in FIG. 12 will be described. FIG. 12 shows a fifth example of an entry determination. In the example shown in FIG. 12, the feature element setting unit 113 sets a connecting line connecting two articulation points as a feature element, based on image data corresponding to a person. In this case, the entry determining unit 114 determines whether at least a part of a connecting line set as a feature element is in a reference region.

In the case of the example shown in FIG. 12, the feature element setting unit 113 sets a connecting line connecting the tip of a hand and an elbow as a feature element 216. FIG. 12 shows each feature element 216 in a thick solid-white line. Furthermore, in FIG. 12, a part of a feature element 216 overlaps the reference region 240. Accordingly, the entry determining unit 114 determines that the first person image 210 is in the reference region 240.

Thus far, the second example embodiment has been described. The examples described above do not limit the manners in which an entry is detected according to the second example embodiment. For example, in the case of the second example of entry detection shown in FIG. 9, the feature element setting unit 113 may set three or more adjacent articulation points as feature elements. Therefore, the feature element setting unit 113 may set, for example, all the articulation points 211 in the first person image 210 as feature elements. The feature element setting unit 113 can set various feature elements with use of articulation points in a person image. The second example embodiment can provide a determination apparatus, a determination method, a determination system, and a program that each appropriately make a determination in entry detection.

Third Example Embodiment

Next, a third example embodiment will be described. A determination apparatus according to the third example embodiment differs from the determination apparatuses described above in its entry detection technique. To be more specific, the determination apparatus according to the third example embodiment differs from the determination apparatus 20 according to the second example embodiment in the processes that a feature element setting unit 113 and an entry determining unit 114 perform.

The feature element setting unit 113 according to the present example embodiment sets a first feature element and a second feature element from a plurality of articulation points of a person. In this case, furthermore, the entry determining unit 114 determines whether the first feature element is in a first reference region set in advance and determines whether the second feature element is in a second reference region set in advance. Furthermore, an output unit 115 outputs a determination result if the first feature element is in the first reference region and the second feature element is in the second reference region.

Figure 13:
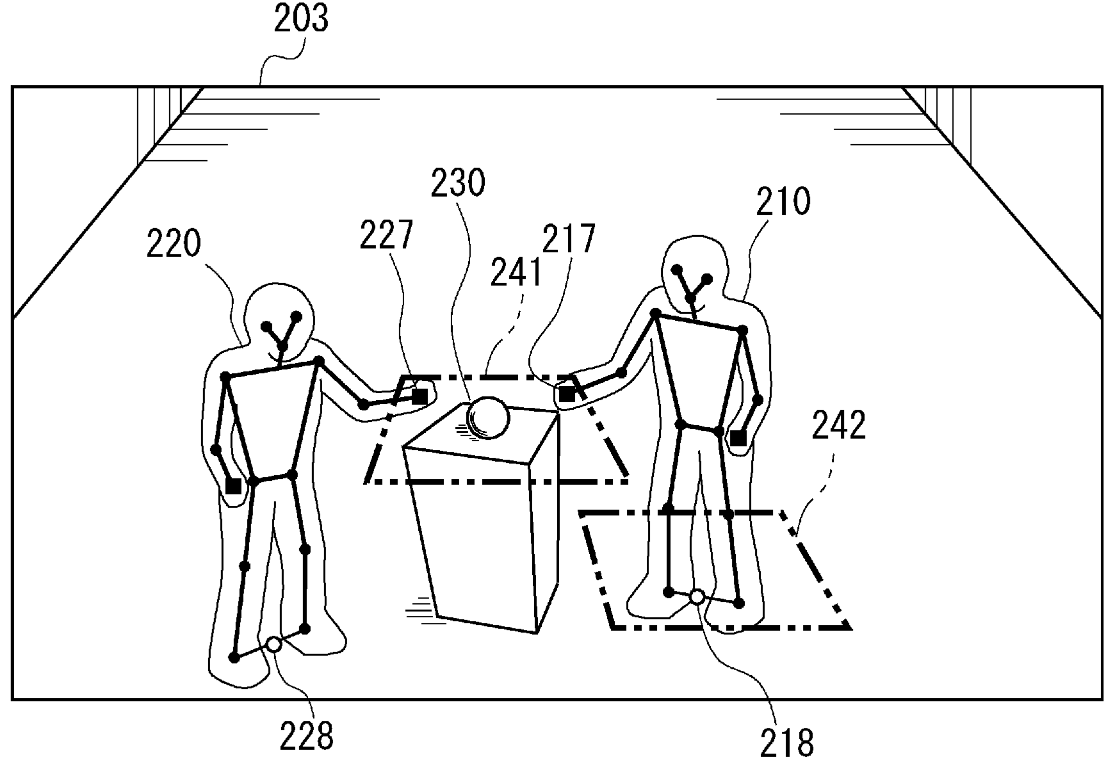
FIG. 13 shows an example of an image to be processed by a determination apparatus according to a third example embodiment.

A process of entry detection according to the present example embodiment will be described along with a specific example with reference to FIG. 13. FIG. 13 shows an example of an image to be processed by a determination apparatus 20 according to the third example embodiment. In an image 203 shown in FIG. 13, the feature element setting unit 113 sets an articulation point at the tip of a hand in a first person image 210 as a first feature element 217. Furthermore, the feature element setting unit 113 sets a center (white circle) of a line segment connecting the articulation points of the feet in the first person image 210 as a second feature element 218. In a similar manner, the feature element setting unit 113 sets an articulation point at the tip of a hand in a second person image 220 as a first feature element 227. Furthermore, the feature element setting unit 113 sets a center (white circle) of a line segment connecting the articulation points of the feet in the second person image 220 as a second feature element 228.

In the example shown in FIG. 13, a first reference region 241 and a second reference region 242 are set. As with the reference region 240 shown in FIG. 6, the first reference region 241 is a predetermined region that includes an object image 230. The second reference region 242 is set on the floor surface to the right of the reference region 241.

The first feature element 217 of the first person image 210 and the first feature element 227 of the second person image 220 are in the first reference region 241. Meanwhile, the second feature element 218 of the first person image 210 is in the second reference region 242. The second feature element 228 of the second person image 220 is outside the second reference region 242.

In the situation above, the entry determining unit 114 determines that the first person image 210, of which the first feature element 217 is in the first reference region 241 and of which the second feature element 218 is in the second reference region 242, is in the first reference region 241. Meanwhile, since, although the first feature element 227 of the second person image 220 is in the first reference region 241, the second feature element 228 of the second person image 220 is not in the second reference region 242, the entry determining unit 114 refrains from determining that the second person image 220 is in the first reference region 241.

Thus far, the third example embodiment has been described. The functions and configuration of the determination apparatus 20 according to the third example embodiment are not limited to those described above. For example, there may be two or more first reference regions 241 or two or more second reference regions 242. Based not only on the condition described above, the determination apparatus 20 may also determine that the first person image 210 is in the second reference region 242 if the length of time in which the second feature element 218 remains in the second reference region 242 is longer than a length of time set in advance (e.g., 3 seconds, 10 seconds, 15 seconds, etc.). Instead of being set between the feet as described above, the second feature element 218 may be served by the articulation point of each foot or may be one of the two feet. Instead of being set at the floor surface, the height of the second reference region 242 may correspond to the height of the waist in a person image or to the position of the head in a person image. In such a case, the second feature element may be set at a part corresponding to the set height of the second reference region.

The output unit 115 may output a determination result if, for example, the first feature element 217 enters the first feature element 217 after the second feature element 218 has entered the second reference region 242. Being configured as described above, the determination apparatus 20 can appropriately make a determination in entry detection while following the order of operations of that person.

In this manner, the third example embodiment can provide a determination apparatus, a determination method, a determination system, and a program that each appropriately make a determination in entry detection.

Fourth Exemplary Embodiment

Figure 14:
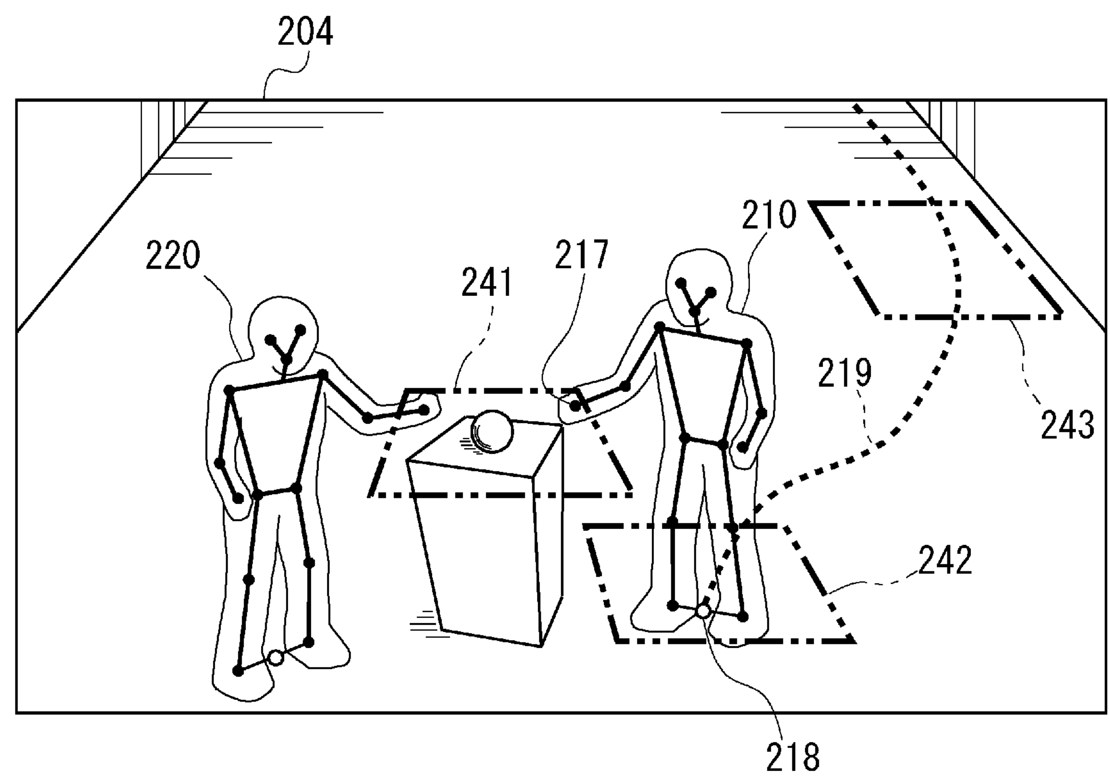
FIG. 14 shows an example of an image to be processed by a determination apparatus according to a fourth example embodiment.

Next, a fourth example embodiment will be described. The fourth example embodiment differs from the determination apparatus 20 according to the third example embodiment in the process related to a reference region. FIG. 14 shows an example of an image to be processed by a determination apparatus 20 according to the fourth example embodiment. In an image 204 shown in FIG. 14, the determination apparatus 20 sets, in addition to a first reference region 241 and a second reference region 242, a third reference region 243. The third reference region 243 is set at a location several meters from the second reference region 242 and at the height of the floor surface as with the second reference region 242.

The determination apparatus 20 according to the present example embodiment follows a path of a person in the image 204. An entry determining unit 114 determines whether a second feature element has passed a third reference region set in advance. In this case, an output unit 115 outputs a determination result if a second feature element 218 enters the second reference region 242 after having passed the third reference region 243 and if a first feature element 217 enters the first reference region 241.

FIG. 14 shows a path 219 of the second feature element 218 set in a first person image 210. The path 219 is a superposition of positions where the second feature element 218 has been during a predetermined period preceding the point when the image 204 is captured. FIG. 14 shows that the second feature element 218 of the first person image 210 enters the second reference region 242 after having passed the third reference region 243. Furthermore, as to the first person image 210, while the second feature element 218 at the feet is in the second reference region 242, the first feature element 217 set at the hand enters the first reference region 241. Accordingly, the entry determining unit 114 of the determination apparatus 20 determines that the first person image 210 is in the first reference region 241.

Thus far, the fourth example embodiment has been described. The determination apparatus 20 described above may include a reference region setting unit that sets a reference region in a predetermined space. Such a configuration makes it possible to set a desired reference region. A reference region may be set while being associated with, for example, the position, the size, or the shape of an object in image data. Then, the determination apparatus 20 can retain a predetermined reference region even when a camera, for example, zooms or pans.

In this manner, the fourth example embodiment can provide a determination apparatus, a determination method, a determination system, and a program that each appropriately make a determination in entry detection while grasping a path of a person's actions.

The programs described above can be stored and supplied to a computer with use of various types of non-transitory computer-readable media. Non-transitory computer-readable media include various types of tangible recording media. Examples of such non-transitory computer-readable media include a magnetic recording medium (e.g., flexible disk, magnetic tape, hard-disk drive), a magneto-optical recording medium (e.g., magneto-optical disk), a CD-ROM (read-only memory), a CD-R, a CD-R/W, or a semiconductor memory (e.g., mask ROM, programmable ROM (PROM), erasable PROM (EPROM), flash ROM, random-access memory (RAM)). The programs may also be supplied to a computer via various types of transitory computer-readable media. Examples of such transitory computer-readable media include an electric signal, an optical signal, or an electromagnetic wave. A transitory computer-readable medium can supply a program to a computer via a wired communication line, such as an electric wire or an optical fiber, or via a wireless communication line.

<Example of Hardware Configuration>

In one case described below, each functional configuration of a determination apparatus according to the present disclosure is implemented by a combination of hardware and software.

Figure 15:
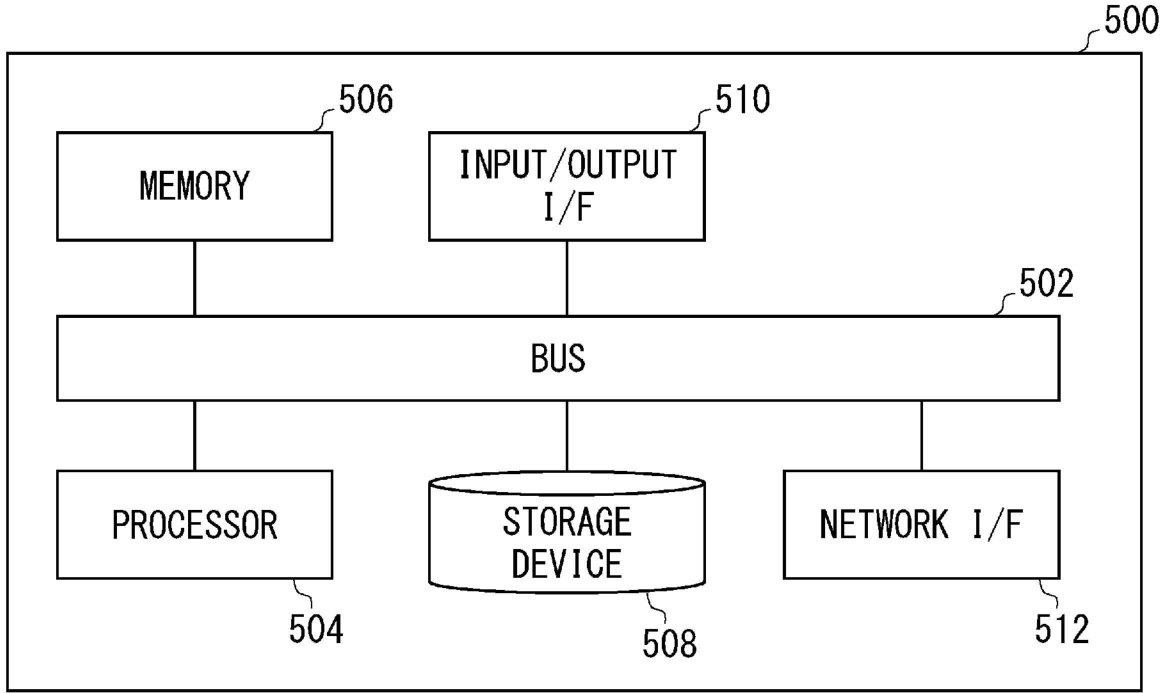
FIG. 15 is a block diagram showing an example of a hardware configuration of a computer.

FIG. 15 is a block diagram showing an example of a hardware configuration of a computer. A determination apparatus according to the present disclosure can implement the functions described above by a computer 500 having a hardware configuration shown in FIG. 15. The computer 500 may be a portable computer, such as a smartphone or a tablet terminal, or may be a non-portable computer, such as a PC. The computer 500 may be a dedicated computer designed to implement each apparatus or may be a general-purpose computer. When a predetermined application is installed on the computer 500, the computer 500 can implement desired functions.

The computer 500 includes a bus 502, a processor 504, a memory 506, a storage device 508, an input/output interface (I/F) 510, and a network interface (I/F) 512. The bus 502 is a data transmission line for the processor 504, the memory 506, the storage device 508, the input/output interface 510, and the network interface 512 to transmit or receive data to or from each other. The manner of interconnecting the processor 504 and so on is not limited to the bus connection.

The processor 504 is any of various processors, such as a CPU, a GPU, or an FPGA. The memory 506 is a main storage device implemented, for example, by a random-access memory (RAM).

The storage device 508 is an auxiliary storage device implemented, for example, by a hard disk, an SSD, a memory card, or a read-only memory (ROM). The storage device 508 stores therein a program for implementing desired functions. The processor 504 implements each functional configuration unit of each apparatus by reading out this program onto the memory 506 and executing the program.

The input/output interface 510 is an interface for connecting the computer 500 to an input/output device. For example, the input/output interface 510 is connected to an input device, such as a keyboard, or to an output device, such as a display device.

The network interface 512 is an interface for connecting the computer 500 to a network.

The present invention is not limited to the foregoing example embodiments, and modifications can be made, as appropriate, within the scope that does not depart from the technical spirit.

Part or the whole of the foregoing example embodiments can also be described as in the following supplementary notes, which are not limiting.

(Supplementary Note 1)

A determination apparatus comprising:

image data acquiring means configured to acquire image data of a predetermined space captured by an image capturing device;

articulation point estimating means configured to estimate articulation points of a person in the image data;

feature element setting means configured to set a feature element of the person based on the articulation points;

entry determining means configured to determine whether the person is in a reference region set in advance, based on the feature element; and output means configured to output information regarding a determination result of the determination made by the entry determining means.

(Supplementary Note 2)

The determination apparatus according to Supplementary Note 1, wherein the feature element setting means is configured to set an end point of the articulation points as the feature element.

(Supplementary Note 3) The determination apparatus according to Supplementary Note 2, wherein the feature element setting means is configured to set a head, a tip of a hand, or a tip of a foot of the person as the end point of the articulation points.

(Supplementary Note 4)

The determination apparatus according to Supplementary Note 2 or 3, wherein the feature element setting means is configured to set a plurality of adjacent articulation points including the end point as the feature elements respectively, and the entry determining means is configured to determine whether all of the plurality of adjacent feature elements are in the reference region.

(Supplementary Note 5)

The determination apparatus according to Supplementary Note 1, wherein the feature element setting means is configured to set, of the articulation points, a plurality of adjacent articulation points corresponding to an arm or a leg of the person as the feature element.

(Supplementary Note 6)

The determination apparatus according to Supplementary Note 1, wherein the feature element setting means is configured to identify a circumscribed rectangle that touches an exterior side of the person and to set an articulation point that touches the circumscribed rectangle as the feature element.

(Supplementary Note 7)

The determination apparatus according to Supplementary Note 1, wherein the feature element setting means is configured to set connecting lines each connecting two of the articulation points, based on the image data corresponding to the person, and to set an articulation point connected to only one connecting line as the feature element.

(Supplementary Note 8)

The determination apparatus according to Supplementary Note 1, wherein the feature element setting means is configured to set a connecting line connecting two of the articulation points as the feature element, based on the image data corresponding to the person, and the entry determining means is configured to determine whether at least a part of the connecting line set as the feature element is in the reference region.

(Supplementary Note 9)

The determination apparatus according to any one of Supplementary Notes 1 to 8, wherein the output means is configured to output the determination result if the feature element is determined to be in the reference region.

(Supplementary Note 10)

The determination apparatus according to any one of Supplementary Notes 1 to 9, wherein the feature element setting means is configured to set a first feature element and a second feature element based on the plurality of articulation points of the person, and the entry determining means is configured to determine whether the first feature element is in a first reference region set in advance and to determine whether the second feature element is in a second reference region set in advance.

(Supplementary Note 11)

The determination apparatus according to Supplementary Note 10, wherein the output means is configured to output the determination result if the first feature element is in the first reference region and if the second feature element is in the second reference region.

(Supplementary Note 12)

The determination apparatus according to Supplementary Note 11, wherein the entry determining means is configured to further determine whether the second feature element has passed through a third reference region set in advance, and the output means is configured to output the determination result if the second feature element enters the second reference region after having passed through the third reference region and if the first feature element is in the first reference region.

(Supplementary Note 13)

The determination apparatus according to any one of Supplementary Notes 10 to 12, wherein the output means is configured to output the determination result if the first feature element enters the first reference region after the second feature element has entered the second reference region.

(Supplementary Note 14)

A determination system comprising:

the determination apparatus according to any one of Supplementary Notes 1 to 13; and a camera configured to supply, to the determination apparatus, the image data that the camera has generated by capturing a predetermined space.

(Supplementary Note 15)

A determination method, executed by a computer, the determination method comprising:

acquiring image data of a predetermined space captured by an image capturing device;

estimating articulation points of a person in the image data;

setting a feature element of the person based on the articulation points;

determining whether the person is in a reference region set in advance, based on the feature element; and outputting information regarding a determination result of the determining.

(Supplementary Note 16)

A non-transitory computer-readable medium storing an information controlling program that causes a computer to execute a determination method, the determination method comprising:

acquiring image data of a predetermined space captured by an image capturing device;

estimating articulation points of a person in the image data;

setting a feature element of the person based on the articulation points;

determining whether the person is in a reference region set in advance, based on the feature element; and outputting information regarding a determination result of the determining.

REFERENCE SIGNS LIST

1 DETERMINATION SYSTEM
10 DETERMINATION APPARATUS
20 DETERMINATION APPARATUS
111 IMAGE DATA ACQUIRING UNIT
112 ARTICULATION POINT ESTIMATING UNIT
113 FEATURE ELEMENT SETTING UNIT
114 ENTRY DETERMINING UNIT
115 OUTPUT UNIT
116 DISPLAY
120 STORAGE UNIT
201 IMAGE
210 FIRST PERSON IMAGE
220 SECOND PERSON IMAGE
230 OBJECT IMAGE
240 REFERENCE REGION
300 CAMERA
900 SPACE
N1 NETWORK

What is claimed is:

1. A determination apparatus comprising:

at least one memory storing instructions, and at least one processor configured to execute the instructions to:

acquire image data of a predetermined space captured by an image capturing device;

perform a convolution process on the image data to identify a feature value of a person in the image data;

estimate a plurality of articulation points of the person in the image data;

set a feature element of the person based on the articulation points, the feature element being set for entry detection;

determine whether or not the person has entered a predetermined area; and output information regarding a determination result of the determination, wherein the setting of the feature element of the person comprises:

setting, as a first feature element, an articulation point at a tip of a hand of the person from among the estimated plurality of articulation points; and setting, as a second feature element, either a midpoint of a line segment connecting articulation points of both feet of the person or an articulation point of a foot of the person, from among the estimated plurality of articulation points, the determining whether or not the person has entered a predetermined are comprises:

determining whether the first feature element is in a first reference region, the first reference region being a rectangular region parallel to a horizontal plane of the predetermined space and including a predetermined object image;

determining whether the second feature element is in a second reference region, the second reference region being adjacent to the first reference region at a same height as a floor surface of the predetermined space;

determining whether the second feature element has passed through a third reference region, the third reference region being at the same height as the floor surface and not overlapping the second reference region; and determining that the person has entered the predetermined area if, after the second feature element passes through the third reference region, it is determined that the first feature element is in the first reference region and the second feature element is in the second reference region, and the outputting includes outputting, if it is determined that the person has entered the predetermined area, the information.

2. The determination apparatus according to claim 1, wherein the convolution process comprises searching the image data for a region that has a feature value matching a feature value of a person image.

3. A determination system comprising:

the determination apparatus according to claim 1; and a camera configured to supply, to the determination apparatus, the image data that the camera has generated by capturing a predetermined space.

4. A determination method, executed by a computer, the determination method comprising:

acquiring image data of a predetermined space captured by an image capturing device;

performing a convolution process on the image data to identify a feature value of a person in the image data;

estimating a plurality of articulation points of the person in the image data;

setting a feature element of the person based on the articulation points, the feature element being set for entry detection;

determining whether or not the person has entered a predetermined area; and outputting information regarding a determination result of the determining, wherein the setting of the feature element of the person comprises:

setting, as a first feature element, an articulation point at a tip of a hand of the person from among the estimated plurality of articulation points; and setting, as a second feature element, either a midpoint of a line segment connecting articulation points of both feet of the person or an articulation point of a foot of the person, from among the estimated plurality of articulation points, the determining whether or not the person has entered a predetermined are comprises:

determining whether the first feature element is in a first reference region, the first reference region being a rectangular region parallel to a horizontal plane of the predetermined space and including a predetermined object image;

determining whether the second feature element is in a second reference region, the second reference region being adjacent to the first reference region at a same height as a floor surface of the predetermined space;

determining whether the second feature element has passed through a third reference region, the third reference region being at the same height as the floor surface and not overlapping the second reference region; and determining that the person has entered the predetermined area if, after the second feature element passes through the third reference region, it is determined that the first feature element is in the first reference region and the second feature element is in the second reference region, and the outputting includes outputting, if it is determined that the person has entered the predetermined area, the information.

5. The determination method according to claim 4, wherein the convolution process comprises searching the image data for a region that has a feature value matching a feature value of a person image.

6. A non-transitory computer-readable medium storing an information controlling program that causes a computer to execute a determination method, the determination method comprising:

acquiring image data of a predetermined space captured by an image capturing device;

performing a convolution process on the image data to identify a feature value of a person in the image data;

estimating a plurality of articulation points of the person in the image data;

setting a feature element of the person based on the articulation points, the feature element being set for entry detection;

determining whether or not the person has entered a predetermined area; and outputting information regarding a determination result of the determining, wherein the setting of the feature element of the person comprises:

setting, as a first feature element, an articulation point at a tip of a hand of the person from among the estimated plurality of articulation points; and setting, as a second feature element, either a midpoint of a line segment connecting articulation points of both feet of the person or an articulation point of a foot of the person, from among the estimated plurality of articulation points, the determining whether or not the person has entered a predetermined are comprises:

determining whether the first feature element is in a first reference region, the first reference region being a rectangular region parallel to a horizontal plane of the predetermined space and including a predetermined object image;

determining whether the second feature element is in a second reference region, the second reference region being adjacent to the first reference region at a same height as a floor surface of the predetermined space;

determining whether the second feature element has passed through a third reference region, the third reference region being at the same height as the floor surface and not overlapping the second reference region; and determining that the person has entered the predetermined area if, after the second feature element passes through the third reference region, it is determined that the first feature element is in the first reference region and the second feature element is in the second reference region, and the outputting includes outputting, if it is determined that the person has entered the predetermined area, the information.

7. The non-transitory computer-readable medium according to claim 6, wherein the convolution process comprises searching the image data for a region that has a feature value matching a feature value of a person image.

* * * * *